United States Patent
Uno et al.

(10) Patent No.: US 8,223,413 B2
(45) Date of Patent: Jul. 17, 2012

(54) HOLOGRAM RECORDER

(75) Inventors: Kazushi Uno, Kawasaki (JP); Koichi Tezuka, Kawasaki (JP); Hiroyasu Yoshikawa, Kawasaki (JP); Yasumasa Iwamura, Kawasaki (JP); Yuzuru Yamakage, Kawasaki (JP); Satoshi Shimokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 12/749,080

(22) Filed: Mar. 29, 2010

(65) Prior Publication Data
US 2010/0182664 A1 Jul. 22, 2010

Related U.S. Application Data

(63) Continuation of application No. PCT/JP2007/073814, filed on Dec. 11, 2007.

(51) Int. Cl.
*G03H 1/04* (2006.01)
*G03H 1/10* (2006.01)

(52) U.S. Cl. .......................... 359/35; 359/10; 359/211.1

(58) Field of Classification Search .................. 359/10, 359/11, 35, 211.1
See application file for complete search history.

(56) References Cited

U.S. PATENT DOCUMENTS

| 3,622,794 | A * | 11/1971 | Pond et al. ................. 250/201.9 |
| 7,109,640 | B2 | 9/2006 | Park |
| 7,149,015 | B2 | 12/2006 | Hoogland et al. |
| 7,405,853 | B2 * | 7/2008 | Sissom et al. ............. 359/198.1 |
| 7,532,373 | B2 | 5/2009 | Tsukagoshi et al. |
| 2008/0158628 | A1 | 7/2008 | Tsukagoshi et al. |

FOREIGN PATENT DOCUMENTS

| JP | 63-11724 | 1/1988 |
| JP | 06-349087 | 12/1994 |
| JP | 2000-338846 | 12/2000 |
| JP | 2004-362741 | 12/2004 |
| JP | 2005-148242 | 6/2005 |
| JP | 2005-234145 | 9/2005 |
| JP | 2005-257885 | 9/2005 |
| JP | 2005-301143 | 10/2005 |
| WO | WO 2007/094042 A1 | 8/2007 |

OTHER PUBLICATIONS

Office action issued by the Japanese Patent Office in corresponding application No. 2009-545313, mailed Jan. 5, 2012.

* cited by examiner

*Primary Examiner* — Audrey Y Chang
(74) *Attorney, Agent, or Firm* — Greer Burns & Crain, Ltd.

(57) ABSTRACT

A hologram recorder includes a signal beam irradiator to irradiate a signal beam, which is optically modulated in accordance with information to be recorded, to a recording medium at a predetermined incident angle. The hologram recorder also includes a recording prism provided with surfaces including an incident surface, a reflective surface and an emission surface for light so that a recording reference beam is guided to the recording medium by way of these surfaces. A pivot mechanism of the hologram recorder causes the recording prism to pivot above the recording medium for changing the incident angle of the recording reference beam at the recording medium, with the recording reference beam kept to overlap the signal beam.

3 Claims, 8 Drawing Sheets

HOLOGRAM RECORDER

This application is a Section 111 continuation of patent application Ser. No. PCT/JP2007/073814, filed on Dec. 11, 2007, the entire contents of which are incorporated herein by reference.

TECHNICAL FIELD

The present invention relates to a hologram recorder for recording multiple holograms by changing the incident angle of a reference beam while keeping the incident angle of a signal beam constant.

BACKGROUND ART

An example of conventional hologram recorder is disclosed in Patent Document 1. In the hologram recorder disclosed in this document, a signal beam is irradiated perpendicularly to a recording medium, while a reference beam for recording (hereinafter referred to as a "recording reference beam") is irradiated with various incident angles, which is achieved by controlling the inclination of a multiple mirror. The multiple mirror is held inclined, with a point supported by a support member serving as a fulcrum. The support member is movable in parallel to the recording medium. The recording reference beam is caused to strike the recording medium at various incident angles in accordance with the inclination of the multiple mirror. In this process, the multiple mirror moves in parallel to the recording medium so that the recording reference beam overlaps the signal beam. With this arrangement, due to the interference of the signal beam and the recording reference beam on the recording medium, multiple holograms corresponding to the crossing angle are recorded.

Patent Document 1: Japanese Laid-open Patent Publication No. 2005-234145

In the conventional hologram recorder, however, to change the incident angle of the recording reference beam, the inclination of the multiple mirror needs to be controlled. Further, the amount of parallel movement of the multiple mirror relative to the recording medium also needs to be controlled for preventing the recording reference beam from deviating from the position irradiated with the signal beam. Thus, the control is complicated.

Moreover, the recording reference beam strikes the multiple mirror with a constant beam diameter. Thus, according to the cosine law of illumination, the light intensity on the recording medium decreases as the incident angle at the recording medium increases. Such decrease in the light intensity can be compensated for by increasing the irradiation time in accordance with an increase in the incident angle, which, however, makes the recording time longer.

DISCLOSURE OF THE INVENTION

The present invention has been proposed under the circumstances described above. It is therefore an object of the present invention to provide a hologram recorder which is capable of controlling the irradiation of the recording reference beam easily and quickly.

To solve the above-described problems, an embodiment of the present invention takes the following technical measures.

A hologram recorder provided according to an embodiment of the present invention includes a signal beam irradiator to irradiate a signal beam, which is optically modulated in accordance with information to be recorded, to a recording medium at a predetermined incident angle. The hologram recorder also includes a recording prism provided with a plurality of surfaces, including at least an incident surface, a reflective surface and an emission surface for light, and the recording prism guides a recording reference beam in a manner such that the recording reference beam travels by way of these surfaces successively and then reaches the recording medium. The hologram recorder further includes a pivot mechanism for pivoting the recording prism relative to the recording medium to change the incident angle of the recording reference beam at the recording medium, with the recording reference beam kept to overlap the signal beam.

Preferably, the recording prism may be arranged above the recording medium to reflect the recording reference beam at an obtuse angle at the reflective surface.

Preferably, the hologram recorder may further include a reproducing prism provided with a plurality of surfaces, including at least an incident surface, a reflective surface and an emission surface for light, and the reproducing prism guides a reproducing reference beam in a manner such that the reproducing reference beam travels by way of these surfaces successively and then reaches the recording medium. The reproducing prism is arranged below the recording medium to guide the reproducing reference beam on the opposite side from the recording prism, and to reflect the reproducing reference beam at an obtuse angle at the reflective surface of the reproducing prism.

Preferably, the pivot mechanism may include an arm member and a driving motor for moving the arm member. The arm member includes ends located above and below the recording medium, respectively, with the recording prism and the reproducing prism fixed to these ends. The driving motor causes the arm member to rotate about an axis extending in parallel to the recording medium.

BEST MODE FOR CARRYING OUT THE INVENTION

Preferred embodiments of the present invention are described below with reference to the accompanying drawings.

Figure 1:
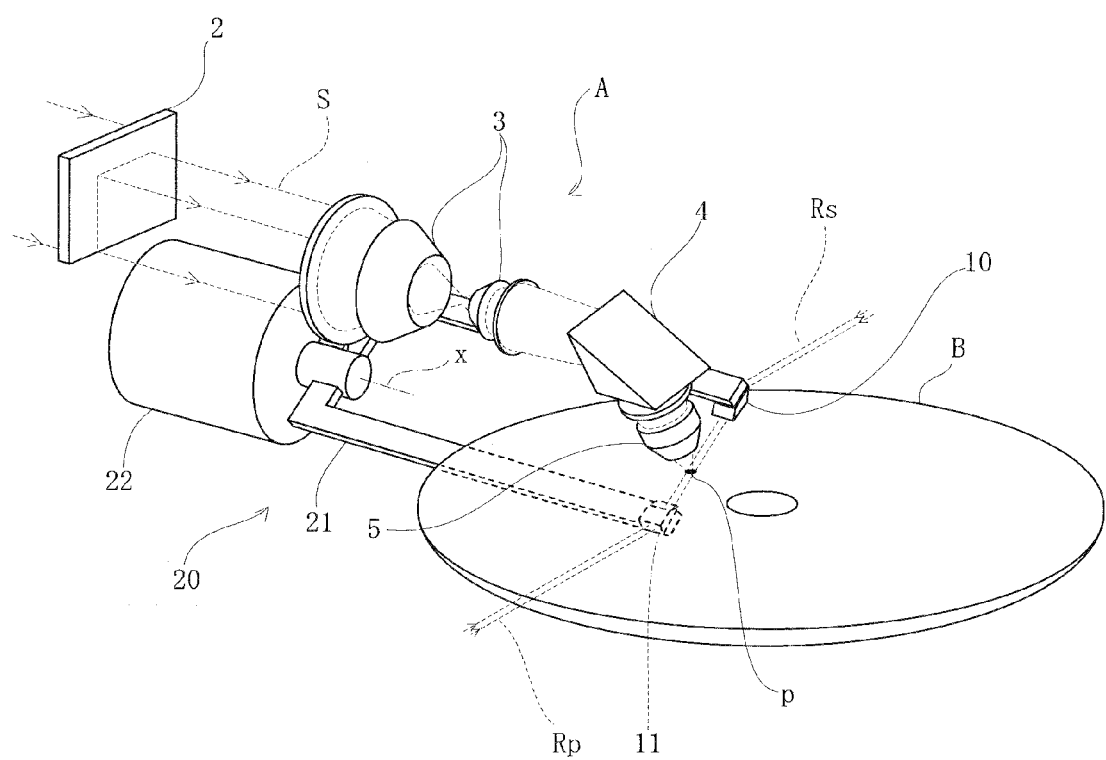
FIG. 1 is a perspective view illustrating a hologram recorder according to an embodiment of the present invention.

FIGS. 1-5 illustrate a hologram recorder according to an embodiment of the present invention. As illustrated in FIG. 1, the hologram recorder A of this embodiment is designed to record multiple holograms onto a disk-like hologram recording medium B by an angular multiplexing method, in which a signal beam S inclined in a predetermined direction is irradiated to strike the recording medium B at a constant incident angle θs (see FIG. 2), while a recording reference beam Rs is irradiated to the irradiation area p of the signal beam S, with the incident angle changed under control. A plurality of holograms corresponding to the incident angles of the recording reference beam Rs are recorded onto the irradiation area p in a superposing manner, and the irradiation area p serves as the recording area (p). The hologram recorder A also has a function to reproduce holograms, which is performed by irradiating a reproducing reference beam Rp to the recording area p in a direction reverse to the recording reference beam Rs, with the incident angle changed under control, and receiving a reproduction beam corresponding to the incident angle in the recording process.

The hologram recorder A includes a signal beam irradiator for irradiating the signal beam S to the recording medium B, and a reference beam irradiator for irradiating the recording reference beam Rs or the reproducing reference beam Rp, with the incident angle changed under control. Though not illustrated, there are also provided a light source for emitting a laser beam, a beam splitter for splitting the laser beam into the signal beam S and the reference beams Rs, Rp, a collimator lens for converting the laser beam into a parallel beam, optical elements for reproduction such as an image pickup device for receiving the reproduction beam, and so on.

The signal beam irradiator is made up of a spatial light modulator 2, a relay lens 3, a half mirror 4 and an objective lens 5. The reference beam irradiator is made up of a recording prism 10 for guiding the recording reference beam Rs to the recording medium B, a reproducing prism 11 for guiding the reproducing reference beam Rp to the recording medium B, and a pivot mechanism 20 for pivoting these prisms together. The pivot mechanism 20 is made up of a U-shaped arm member 21 and a driving motor 22. The recording prism 10 is fixed to an end of the arm member 21 arranged above the recording medium B. The reproducing prism 11 is fixed to the other end of the arm member 21 arranged below the recording medium B. The arm member 21 is pivotable about a rotation axis x of the driving motor 22. The driving motor 22 is so arranged that the rotation axis x extends in the radial direction of the recording medium B. The signal beam irradiator, the reference beam irradiator or the pivot mechanism 20 made up of the above-described structural elements are mounted on a carriage member (not illustrated) which is reciprocally movable in the radial direction of the recording medium B. With this arrangement, the signal beam S and the reference beams Rs, Rp can be irradiated to a desired irradiation area p by means of seek operation and rotation of the recording medium B.

Figure 2:
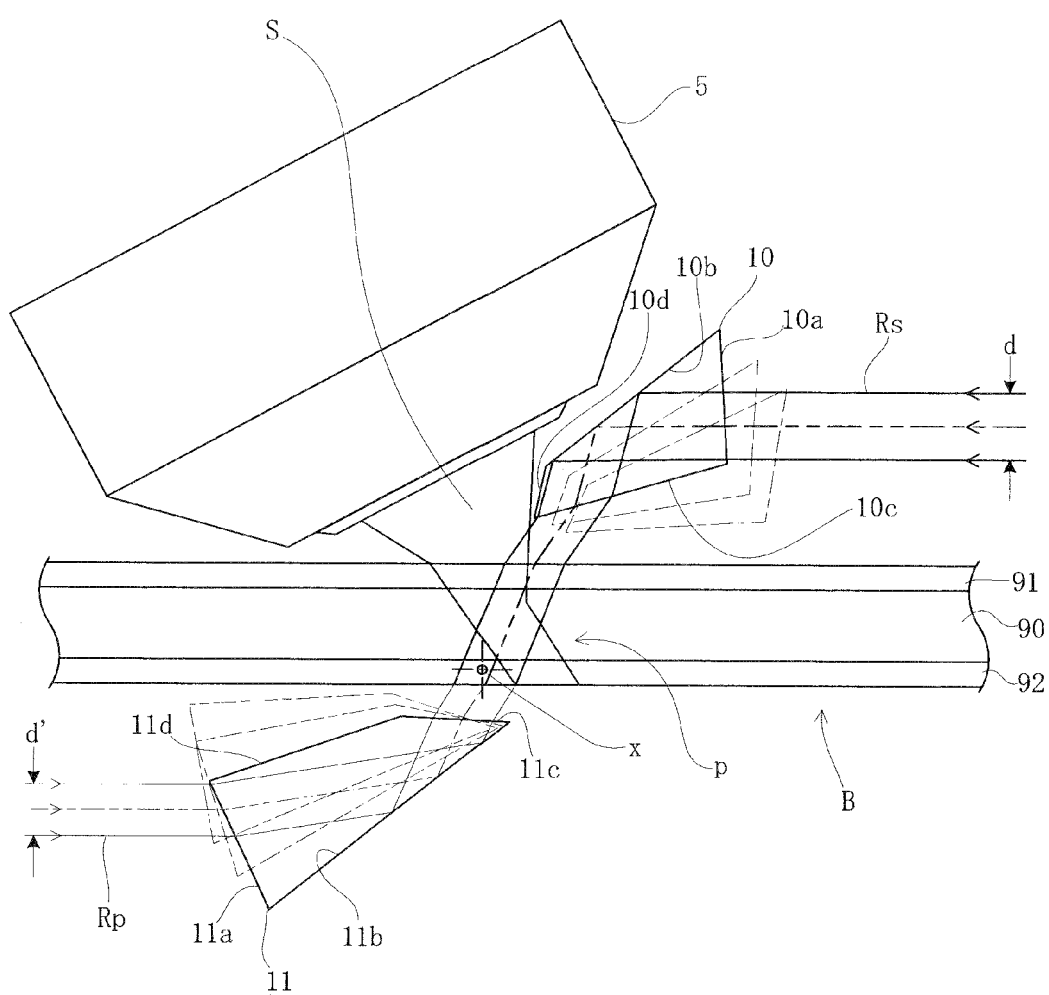
FIG. 2 is an enlarged sectional view of a principal portion of the hologram recorder illustrated in FIG. 1.

As illustrated in e.g. FIG. 2, the recording medium B is made up of a recording layer 90 of e.g. a photo polymer as an intermediate layer, and light transmitting cover layers 91 and 92 laminated on opposite surfaces of the recording layer 90. In this embodiment, the recording layer 90 has a thickness of about 1.5 mm, whereas the cover layers 91 and 92 have a thickness of about 0.5 mm, for example. In the recording process, the signal beam S and the recording reference beam Rs are irradiated above the hologram recording medium B. In the reproducing process, only the reproducing reference beam Rp is irradiated below the recording medium B.

The laser beam emitted from the non-illustrated light source is converted by the non-illustrated collimator lens into a parallel beam and then split into a signal beam S and a recording reference beam Rs or a reproducing reference beam Rp by the beam splitter. The signal beam S is guided to the spatial light modulator 2, the recording reference beam Rs is guided to the recording prism 10, and the reproducing reference beam Rp is guided to the reproducing prism 11.

The spatial light modulator 2 is made of e.g. a transmissive liquid crystal device, and modulates the incoming signal beam S into a beam having a two-dimensional pixel pattern in accordance with the information to be recorded. The signal beam S exiting the spatial light modulator 2 is guided to the half mirror 4 through the zoom lens 3 and finally directed to the recording medium B through the objective lens 5. The objective lens 5 is so arranged that its optical axis forms a predetermined incident angle with respect to the recording medium B. As illustrated in e.g. FIG. 2, as viewed in section, the irradiation area p of the signal beam S is generally in the form of a parallelogram in the recording layer 90.

As illustrated in sectional views such as FIG. 2, the recording prism 10 and the reproducing prism 11 have respective incident surfaces 10a, 11a, reflective surfaces 10b, 11b and emission surfaces 10c, 11c and are pivoted together about the rotation axis x of the driving motor 22. The recording reference beam Rs, which is generally parallel to the recording medium B and has a constant beam diameter d, is irradiated to the incident surface 10a of the recording prism 10. The reproducing reference beam Rp, which is generally parallel to the recording medium B and has a constant beam diameter d', is irradiated to the incident surface 11a of the reproducing prism 11. For instance, the beam diameter d of the recording reference beam Rs is about 1.4 mm, whereas the beam diameter d' of the reproducing reference beam Rp is about 1.05 mm.

The recording prism 10 is made of e.g. glass having an index of refraction which is higher than that of air, and the vertex is eliminated to avoid interference with the signal beam S emitted from the objective lens 5 or the recording medium B. In addition to the incident surface 10a, the reflective surface 10b and the emission surface 10c, the recording prism 10 has a surface 10d which does not contribute to the optical action. Of these surfaces, at least the incident surface 10a and the emission surface 10c are formed with a non-reflective coating film. The thinnest portion of the recording prism 10 has a thickness of about 0.957 mm. The recording reference beam Rs enters the recording prism 10 always through the incident surface 10a. The recording reference beam Rs is refracted at the incident surface 10a to some extent and then reflected at the reflective surface 10b at an obtuse angle. The recording reference beam Rs is then refracted at the emission surface 10c to be irradiated to the upper surface of the recording medium B. In the above-described process, the incident angle of the recording reference beam Rs at the reflective surface 10b is larger than a predetermined critical angle. Thus, since the total reflection condition is satisfied, the recording reference beam Rs is reflected at the reflective surface 10b, although a reflective film is not formed on the surface.

Similarly to the recording prism 10, the reproducing prism 11 is made of a glass. The reproducing prism 11 also has a surface 11d which does not contribute to the optical action, in addition to the incident surface 11a, the reflective surface 11b and the emission surface 11c. Of these surfaces, at least the incident surface 11a and the emission surface 11c are formed with a non-reflective coating film. The thickness of the reproducing prism 11 is substantially equal to that of the recording prism 10. The reproducing reference beam Rp enters the reproducing prism 11 always through the incident surface 11a. The reproducing reference beam Rp is refracted at the incident surface 11a to some extent and then reflected at the reflective surface 11b at an obtuse angle. The reproducing reference beam Rp is then refracted at the emission surface 11c to be irradiated to the lower surface of the recording medium B. In the reproducing prism 11 again, the incident angle of the reproducing reference beam Rp at the reflective surface 11b is larger than a predetermined critical angle. Thus, since the total reflection condition is satisfied, the reproducing reference beam Rp is reflected at the reflective surface 11b, although a reflective film is not formed on the surface.

Figure 3:
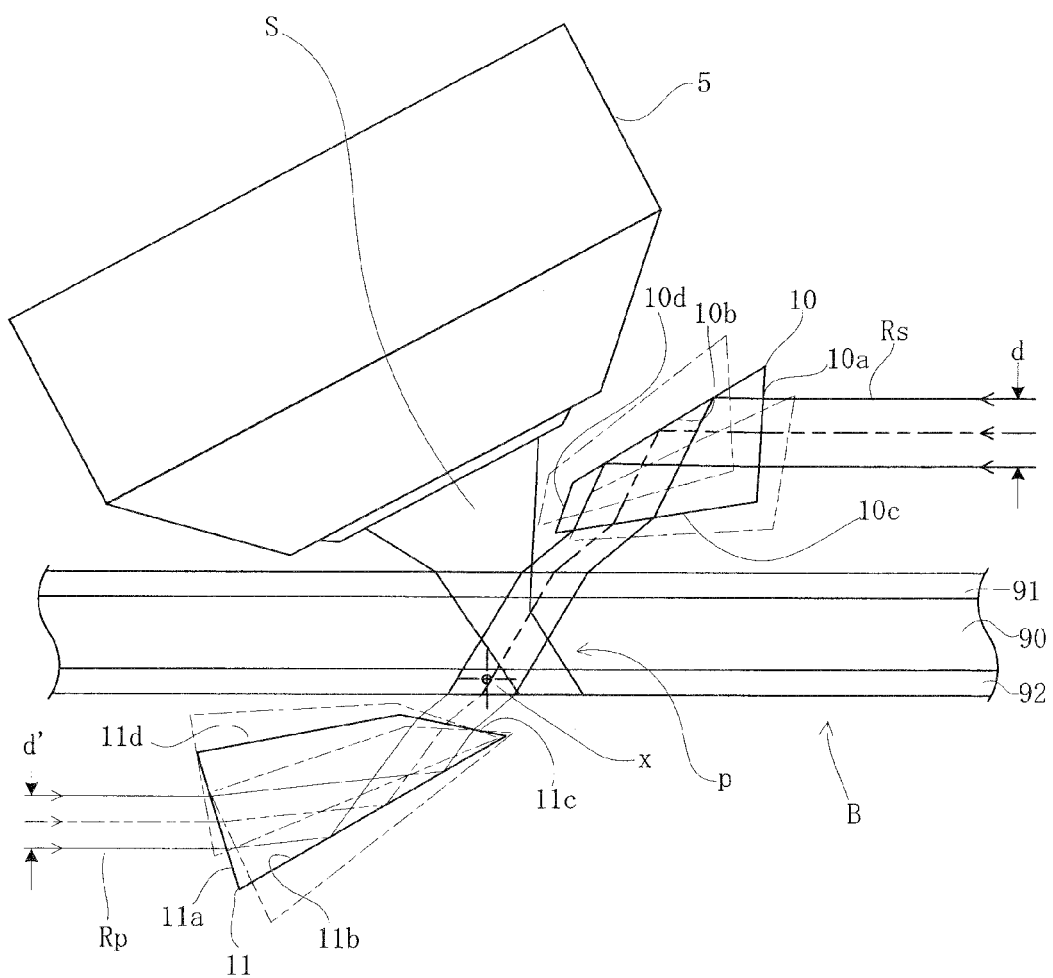
FIG. 3 is an enlarged sectional view of a principal portion of the hologram recorder illustrated in FIG. 1.
Figure 4:
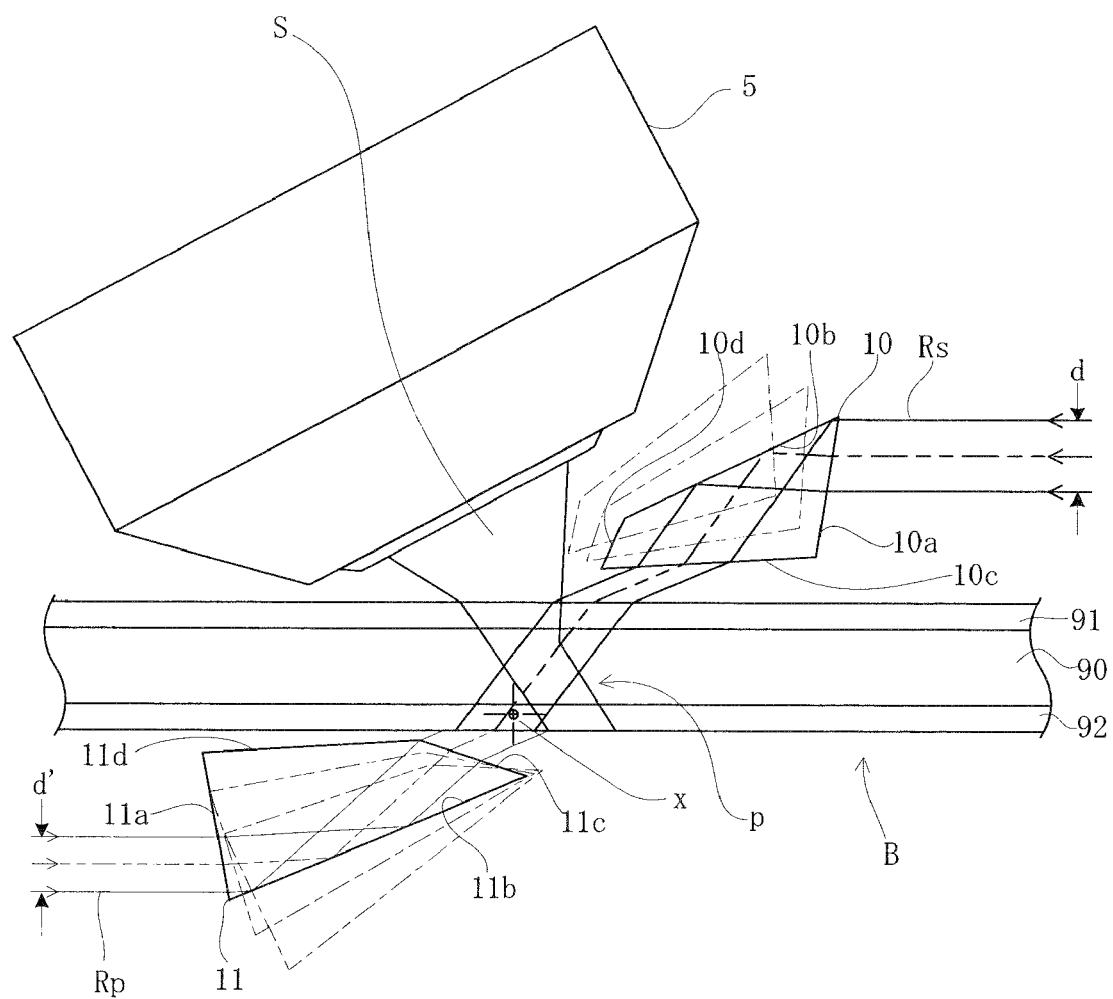
FIG. 4 is an enlarged sectional view of a principal portion of the hologram recorder illustrated in FIG. 1.

As indicated by solid lines in FIGS. 2-4, the recording prism 10 and the reproducing prism 11 are so positioned that the incident angle of the recording reference beam Rs at the recording medium B and that of the reproducing reference beam Rp be equal to each other even during the pivot movement of the arm member 21 in accordance with the operation of the driving motor 22. For instance, both of the incident angle of the recording reference beam Rs and that of the reproducing reference beam Rp are 34 degrees in the state illustrated in FIG. 2, 50.7 degrees in the state illustrated in FIG. 3 and 67 degrees in the state illustrated in FIG. 4. Further, the recording prism 10 and the reproducing prism 11 have an optical function to reduce the beam diameter of the reference beams Rs, Rp by a larger amount as the incident angle of the reference beams Rs, Rp at the recording medium B increases. For instance, when the recording reference beam Rs and the reproducing reference beam Rp which have beam diameters of 1.4 mm and 1.05 mm, respectively, enter the relevant prisms at an incident angle of 34 degrees (the state illustrated in FIG. 2), the respective beam diameters after exiting the prisms are about 1.05 mm and 1.02 mm. By contrast, when the incident angle is 50.7 degrees (the state illustrated in FIG. 3), the respective beam diameters after exiting the prisms are about 0.87 mm and 0.92 mm. When the incident angle is 67 degrees (the state illustrated in FIG. 4), the respective beam diameters after exiting the prisms are about 0.61 mm and 0.81 mm.

When the cosine law of illumination is applied to the above-described beam diameters (1.05 mm, 0.87 mm and 0.61 mm) of the recording reference beam Rs after exiting the prism, the irradiation widths of the recording reference beam Rs on the recording medium B are found to be 1.27 mm, 1.37 mm and 1.55 mm. This suggests that even with the cosine law of illumination, the light intensity is not considerably deteriorated and the recording reference beam Rs is irradiated with sufficient light intensity. This holds true for the reproducing reference beam Rp. Specifically, when the cosine law of illumination is applied to the above-described beam diameters (1.02 mm, 0.92 mm and 0.81 mm) of the reproducing reference beam Rp after exiting the prism, the irradiation widths of the reproducing reference beam Rp on the recording medium B are found to be 1.23 mm, 1.45 mm and 2.07 mm. When the incident angle is 67 degrees which is the largest, the difference between the irradiation width of the recording reference beam Rs (1.55 mm) and the irradiation width of the reproducing reference beam Rp (2.07 mm) is relatively large. However, in the reproducing process, the reproducing reference beam Rp is merely irradiated to the recording area p to which holograms have already been recorded. Thus, as compared with the recording process, a decrease in the light intensity in the reproducing process does not lead to a significant problem.

Figure 5:
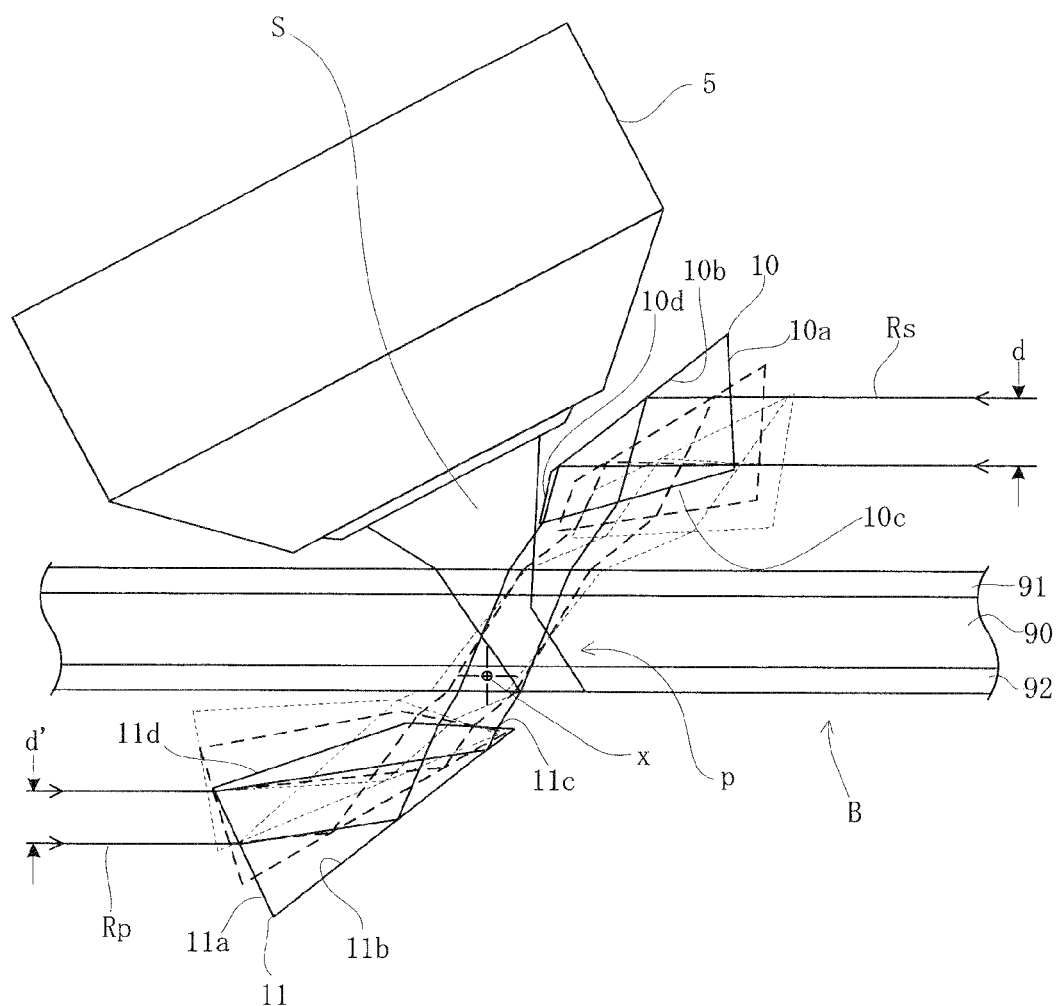
FIG. 5 is an enlarged sectional view of a principal portion of the hologram recorder illustrated in FIG. 1.

In FIG. 5, the state in which the incident angle is 34 degrees is indicated by solid lines, the state in which the incident angle is 50.7 degrees is indicated by broken lines and the state in which the incident angle is 67 degrees is indicated by fine broken lines. As illustrated in the figure, when the incident angle is changed from 34 to 67 degrees, the recording reference beam Rs is not displaced largely in the horizontal direction of the recording medium B, and the amount of displacement of the center of the recording reference beam Rs in the recording layer 90 is about 65 µm. As to the positional relationship between the recording reference beam Rs and the reproducing reference beam Rp, the reference beams Rs and Rp are not displaced largely from each other in the horizontal direction of the recording medium B, and the amount of displacement of the centers of the reference beams Rs and Rp in the recording layer 90 is about 50 µm. This suggests that even when the incident angle is changed, the recording reference beam Rs and the reproducing reference beam Rp are reliably directed to the intended irradiation area p with only an extremely small displacement in the horizontal direction.

The rotation axis x of the driving motor 22 is set to a predetermined position adjacent to the irradiation area p, which is between the recording prism 10 and the reproducing prism 11. In the case where a simple reflective mirror is employed instead of the recording prism 10 and the reproducing prism 11, to change the incident angle of the recording reference beam Rs and the reproducing reference beam Rp in the range of 34 to 67 degrees, the arm member 21 needs to be pivoted about the rotation axis X in the angular range of (67−34)/2=16.5 degrees. However, the optical magnification of the prisms 10 and 11 changes due to rotation. Thus, with the use of the prisms 10 and 11, the arm member 21 is pivoted within an angular range which is smaller than 16.5 degrees in the case of a reflective mirror, in accordance with the magnification. For instance, in this embodiment, to change the incident angle from 34 degrees to 67 degrees, the arm member 21 is pivoted through 12.435 degrees in the recording process and 15.352 degrees in the reproducing process, both of which are smaller than 16.5 degrees. The pivot angle of the arm member 21 is further smaller in the recording process, which uses the recording prism 10 having a larger magnification variation.

The signal beam S is converged by the objective lens 5 and irradiated to overlap the recording reference beam Rs at the irradiation area p. The objective lens 5 is disposed obliquely to the recording medium B so that the main ray of the signal beam S strikes the recording medium B at a predetermined incident angle. With this arrangement, the recording reference beam Rs can be irradiated with large variation of incident angle without being blocked by the objective lens 5. Thus, the incident angle of the recording reference beam Rs can be controlled to a fine degree, which makes it easy to increase the hologram multiplicity. As illustrated in e.g. FIG. 2, in the irradiation area p, a hologram is formed at a portion of the recording layer 90 at which the signal beam S and the recording reference beam Rs overlap each other, and different holograms corresponding to the incident angles of the recording reference beam Rs are recorded in multiplex recording.

In the reproducing process, the reproducing reference beam Rp is irradiated to the recording area p, at which holograms have been formed, at the same incident angle as that in the recording process. The reproducing reference beam Rp is diffracted due to the interference with the recorded hologram, whereby a reproduced beam as a diffracted beam is produced. The reproduced beam passes through the objective lens 5 in a direction reverse to the signal beam S to reach the half mirror 4 and then passes through the half mirror 4 to be received by the non-illustrated image pickup device. The image signal outputted from the image pickup device is subjected to optical demodulation, whereby information recorded as a hologram is reproduced. By performing this series of reproducing processing while changing the incident angle of the reproducing reference beam Rp, the holograms recorded in multiplex recording are reproduced.

The advantages of the hologram recorder A of this embodiment are described below as compared with comparative examples 1-3.

Figure 6:
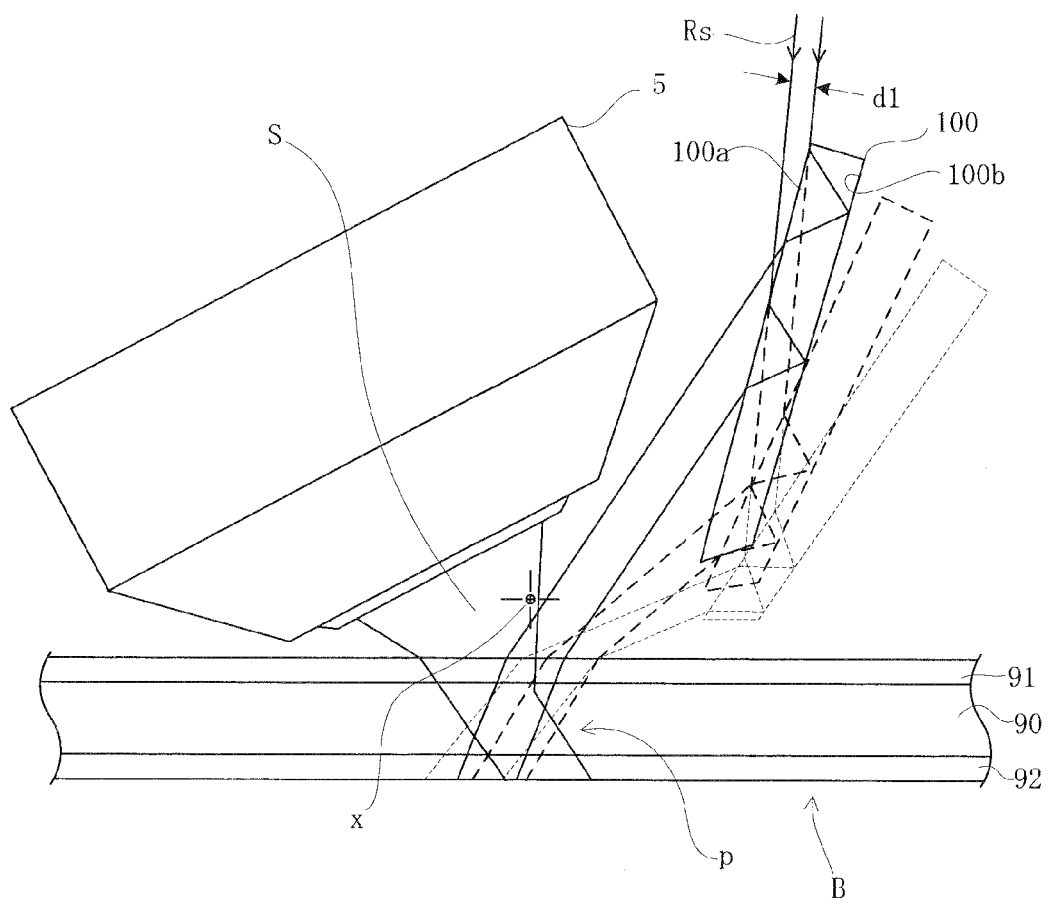
FIG. 6 is an enlarged sectional view illustrating a principal portion of a device as a comparative example 1, which includes a different optical element.
Figure 7:
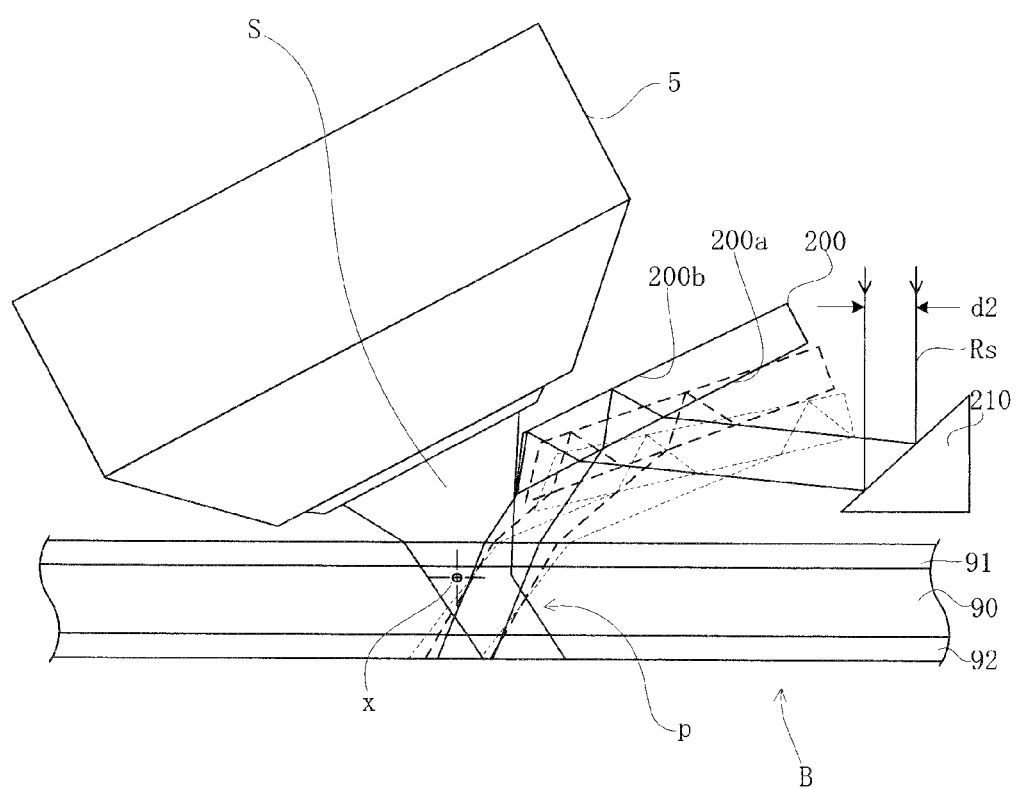
FIG. 7 is an enlarged sectional view illustrating a principal portion of a device as a comparative example 2, which includes a different optical element.

In the comparative example 1 illustrated in FIG. 6, a recording prism 100 is used for the recording reference beam Rs which is generally perpendicular to the recording medium B. In the comparative example 2 illustrated in FIG. 7, a mirror 201 is used in combination with a recording prism 200. In the comparative example illustrated in FIG. 8, a recording prism 300 and a reproducing prism 400 are used for the recording reference beam Rs and the reproducing reference beam Rp which are generally parallel to the recording medium B. In each of the comparative examples 1-3, the incident angle of the recording reference beam Rs is changed in the range of 34 to 67 degrees similarly to the embodiment of the present invention. In each of these figures, the state in which the incident angle is 34 degrees is indicated by solid lines, the state in which the incident angle is generally intermediate is indicated by broken lines and the state in which the incident angle is 67 degrees is indicated by fine broken lines. The comparative examples 1-3 are similar in that the inclined surfaces 100a, 200a, 300a and 400a of the recording prisms 100, 200, 300 and the reproducing prism 400 function as both the incident surface and the emission surface. Further, in all the comparative examples, the recording reference beam Rs or the reproducing reference beam Rp are reflected at the reflective surfaces 100b, 200b, 300b, 400b at an acute angle. These points are different from the recording prism 10 and the reproducing prism 11 of the embodiment of the present invention.

In the comparative example 1 illustrated in FIG. 6, to make the beam diameter after exiting the prism generally equal to that of the embodiment of the present invention, the recording reference beam Rs having a constant beam diameter d1 is caused to strike the incident/emission surface 100a of the recording prism 100 at a relatively large incident angle. The beam diameter d1 before entering the prism is smaller than the beam diameter d of the embodiment of the present invention. Specifically, when the incident angle of the recording reference beam Rs at the recording medium B is set to 34 degrees, 50.7 degrees and 67 degrees, the beam diameters after exiting the prism are 1.01 mm, 0.69 mm and 0.61 mm, respectively. In the recording prism 100 of the comparative example 1, the recording reference beam Rs is caused to strike the incident/emission surface 100a at a relatively large incident angle and to be reflected at the incident/emission surface 100a at an acute angle. For this purpose, the incident/emission surface 100a and the reflective surface 100b need to be relatively large.

Further, in the comparative example 1, when the incident angle is changed from 34 to 67 degrees, the recording reference beam Rs is displaced largely in the horizontal direction of the recording medium B, and the amount of displacement of the center of the recording reference beam Rs in the recording layer 90 is as much as 500 μm or more. Thus, the irradiation point of the recording reference beam Rs tends to deviate from the irradiation area p of the signal beam S, which is at a fixed position. Moreover, when the cosine law of illumination is applied to the beam diameters (1.01 mm, 0.69 mm and 0.61 mm) after exiting the prism, the irradiation widths of the recording reference beam Rs on the recording medium B are found to be 1.22 mm, 1.07 mm and 1.56 mm. This suggests that the area irradiated with the recording reference beam Rs and the signal beam S is insufficient at the intermediate incident angle of 50.7 degrees.

In the comparative example 2 illustrated in FIG. 7 again, to make the beam diameter after exiting the prism generally equal to that of the embodiment of the present invention, the recording reference beam Rs having a constant beam diameter d2 is caused to strike the incident/emission surface 200a of the recording prism 200 at a relatively large incident angle. The incident/emission surface 200a generally faces the recording medium B. The recording reference beam Rs is irradiated to the incident/emission surface 200a via the stationary mirror 210. Specifically, when the incident angle of the recording reference beam Rs at the recording medium B is set to 34 degrees, 49.5 degrees and 67 degrees, the beam diameters after exiting the prism are 1.01 mm, 0.92 mm and 0.61 mm, respectively. With the arrangement of the comparative example 2, the incident/emission surface 200a and the reflective surface 200b of the recording prism 200 are smaller than those of the comparative example 1, but still larger than those of the recording prism 10 of the embodiment of the present invention. Besides, the arrangement of the stationary mirror 210 poses difficulties. To make the incident/emission surface 100a and the reflective surface 200b smaller, it is necessary that the recording reference beam Rs can strike the incident/emission surface 200a from below at an as acute angle as possible. However, the stationary mirror 210 for guiding the recording reference beam Rs comes into contact with the recording medium B, so that the recording prism 200 cannot be made as small as that of the embodiment of the present invention.

Figure 8:
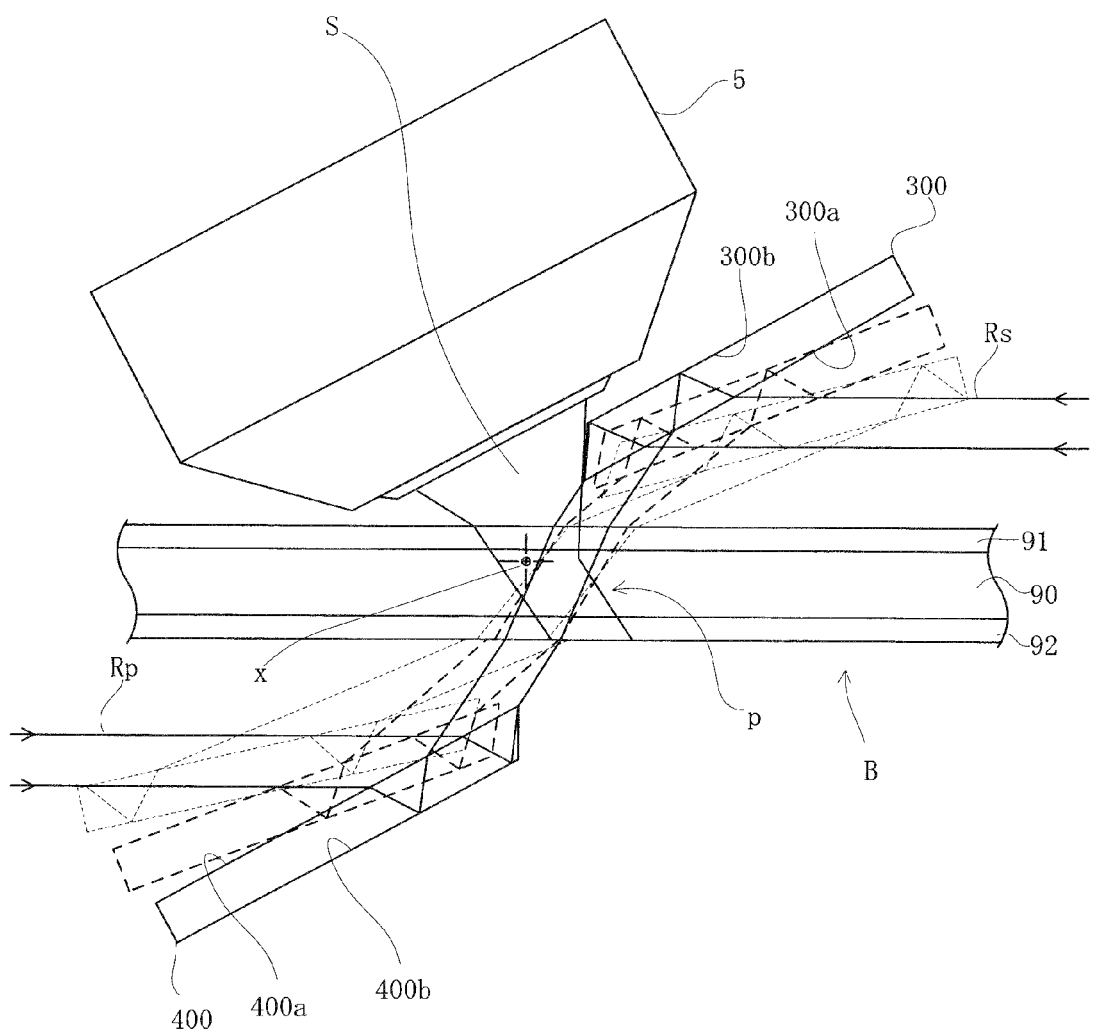
FIG. 8 is an enlarged sectional view illustrating a principal portion of a device as a comparative example 3, which includes a different optical element.

In the comparative example 3 illustrated in FIG. 8, the recording reference beam Rs and the reproducing reference beam Rp which are generally parallel to the recording medium B and have a constant beam diameter are irradiated to the incident/emission surfaces 300a and 400a of the recording prism 300 and the reproducing prism 400, respectively. In the comparative example 3 again, the incident/emission surfaces 300a and 400a generally face the recording medium B. When the incident angle of the recording reference beam Rs at the recording medium B is set to 34 degrees, 49.7 degrees and 67 degrees, the beam diameters of the recording reference beam Rs after exiting the prism are 1.03 mm, 0.93 mm and 0.61 mm, respectively. When the incident angle of the reproducing reference beam Rp at the recording medium B is similarly set to 34 degrees, 49.7 degrees and 67 degrees, the beam diameters of the reproducing reference beam Rp after exiting the prism are 1.08 mm, 1.03 mm and 0.85 mm, respectively. Although the recording prism 300 and the reproducing prism 400 of the comparative example 3 do not require a stationary mirror or the like, the prisms are larger than the prism of the comparative example 2. For instance, in the embodiment of the present invention illustrated in FIGS. 2-5, the distance between the ends of the recording prism 10 or the reproducing prism 11 is 15.2 mm, whereas this distance is 21.9 mm in the example illustrated in FIG. 8. Since the inertia depends on the square of the distance, the difference is about twice when the squares are simply compared.

Moreover, in the comparative example 3, when the incident angle is changed from 34 to 67 degrees, the recording reference beam Rs is displaced relatively largely in the horizontal direction of the recording medium B, and the amount of displacement of the center of the recording reference beam Rs in the recording layer 90 is about 110 μm. As to the positional relationship between the recording reference beam Rs and the reproducing reference beam Rp, the reference beams Rs and Rp are displaced from each other in the horizontal direction of the recording medium B, and the amount of displacement of the centers of the reference beams Rs and Rp in the recording layer 90 is about 90 μm. This suggests that the irradiation point of the recording reference beam Rs and the reproducing reference beam Rp may deviate from the irradiation area (recording area) p, which is at a fixed position. In the comparative example 3, the prism 300 is designed to have as large a thickness as possible, in view of the fact that the prism interferes with the recording beam S when the thickness is too large. With this arrangement, the thickness of the prism at the thinnest portion is e.g. about 0.977 mm, which is generally equal to that of the recording prism 10, but the thickness of the prism 300 at the thickest portion is only about 1.06 mm. That is, only about one half of the thickness 2.27 mm of the recording prism 10 can be secured as the thickness of the prism 300. While the average dimension of the recording prism 10 in the longitudinal direction is 4.337 mm at the center portion, the corresponding dimension is 8.017 mm in the comparative example. Thus, the dimension in the longitudinal direction is about twice that of the present invention.

Moreover, in the comparative examples 1-3, the recording reference beam Rs or the reproducing reference beam Rp is caused to be reflect at the reflective surfaces 100b, 200b, 300b, 400b at an acute angle. Since the incident angle of the recording reference beam Rs or the reproducing reference beam Rp at the reflective surfaces 100b, 200b, 300b, 400b is smaller than a predetermined critical angle, the reflective surfaces 100b, 200b, 300b, 400b need to be formed with a reflection film. Generally, a dielectric multilayer reflection film to be attached to a prism needs to have a thickness of 1 mm for a length of 5 mm. As will be understood from the comparison between the comparative example 3 and the prism 10, the stress of the reflective film attached tends to cause a warp in the comparative example 3.

In the hologram recorder A of the embodiment of the present invention, the reference beams Rs and Rp pass through the separately provided incident surface 10a, 11a and emission surface 10c, 11c of the recording prism 10 or the reproducing prism 11 and are reflected at the reflective surface 10b, 11b at an obtuse angle. This ensures that the recording reference beam Rs and the reproducing reference beam Rp are directed to the fixed irradiation area (recording area) always precisely and the irradiation control is performed easily and quickly. Particularly, since the reference beams Rs, Rp are reflected at the reflective surfaces 10b, 11b due to the total reflection condition, the wave aberration is reduced to as small as possible, which is advantageous.

The recording prism 10 and the reproducing prism 11 of the hologram recorder A of the embodiment of the present invention is small, having a shape which can be obtained by deforming a triangular prism while securing a certain thickness. Thus, the load due to the inertia in pivoting the prisms 10 and 11 is small, so that the pivot movement to change the incident angle can be performed at a high speed.

In the hologram recorder A of the embodiment of the present invention, it is not necessary to arrange a stationary mirror adjacent to the recording medium B or forming a reflection film on the reflective surface of the prism. Thus, the cost for the components and the manufacturing cost are reduced.

The present invention is not limited to the foregoing embodiment.

The dimensions or values described in the foregoing embodiment are merely examples and can be varied appropriately in accordance with the specification within the scope of the claims of the invention.

The invention claimed is:

1. A hologram recorder comprising:
   a signal beam irradiator to irradiate a signal beam to a recording medium at a predetermined incident angle, the signal beam being optically modulated in accordance with information to be recorded;
   a recording prism provided with at least an incident surface, a reflective surface and an emission surface for light, the prism being adapted to guide a recording reference beam in a manner such that the recording reference beam travels successively by way of said surfaces to reach the recording medium;
   a reproducing prism provided with at least an incident surface, a reflective surface and an emission surface for light, the reproducing prism being adapted to guide a reproducing reference beam in a manner such that the reproducing reference beam travels successively by way of said surfaces of the reproducing prism to reach the recording medium; and
   a pivot mechanism for pivoting the recording prism relative to the recording medium to change an incident angle of the recording reference beam at the recording medium while causing the recording reference beam to overlap the signal beam;
   wherein the pivot mechanism includes an arm member and a driving motor, the arm member including ends located above and below the recording medium, respectively, with the recording prism and the reproducing prism fixed to the ends, the driving motor causing the arm member to rotate about an axis extending in parallel to the recording medium.

2. The hologram recorder according to claim 1, wherein the recording prism is arranged above the recording medium to reflect the recording reference beam at an obtuse angle at the reflective surface.

3. The hologram recorder according to claim 2, wherein the reproducing prism is arranged below the recording medium to guide the reproducing reference beam on an opposite side from the recording prism by reflecting the reproducing reference beam at an obtuse angle at the reflective surface.

* * * * *